United States Patent [19]
Lee

[11] Patent Number: 5,877,827
[45] Date of Patent: Mar. 2, 1999

[54] LIQUID CRYSTAL DISPLAY DEVICE HAVING SOURCE ELECTRODE OVERLAPPING GATE LINE

[75] Inventor: Deuk Su Lee, Kyungki-do, Rep. of Korea

[73] Assignee: Goldstar Co., Ltd., Seoul, Rep. of Korea

[21] Appl. No.: 802,524

[22] Filed: Feb. 20, 1997

Related U.S. Application Data

[63] Continuation of Ser. No. 354,672, Dec. 13, 1994, abandoned.

[30] Foreign Application Priority Data

Dec. 15, 1993 [KR] Rep. of Korea ............................. 27952

[51] Int. Cl.[6] ............................ G02F 1/136; G02F 1/1343
[52] U.S. Cl. ................................................................ 349/43
[58] Field of Search ................................. 349/42, 43, 46, 349/139; 257/59, 72; 345/92, 93

[56] References Cited

U.S. PATENT DOCUMENTS

| | | | |
|---|---|---|---|
| 4,705,358 | 11/1987 | Yamazaki et al. | 359/67 |
| 4,783,147 | 11/1988 | Maurice et al. | 349/143 |
| 4,938,566 | 7/1990 | Takeda et al. | 359/55 |
| 5,286,983 | 2/1994 | Sakamoto et al. | 359/54 |
| 5,327,001 | 7/1994 | Wakai et al. | 349/110 |
| 5,339,181 | 8/1994 | Kim et al. | 359/59 |
| 5,453,857 | 9/1995 | Takehara | 359/59 |
| 5,459,596 | 10/1995 | Ueada et al. | 359/59 |

FOREIGN PATENT DOCUMENTS 2-89025  3/1990  Japan ........................................ 359/41

Primary Examiner—Hung X. Dang
Assistant Examiner—Tai V. Duong
Attorney, Agent, or Firm—John P. White; Cooper & Dunham LLP

[57] ABSTRACT

Disclosed is a liquid crystal display device comprising a substrate; a plurality of pixel electrodes arranged in matrix; a plurality of data bus lines, each of the data bus lines being arranged between two adjacent pixel electrodes in row direction; a plurality of gate bus lines spaced from each other, each of the gate bus lines being arranged between two adjacent pixel electrodes in column direction and being intersected with each of the data bus line; and a plurality of thin film transistors arranged in matrix on the substrate, wherein each of the thin film transistors has a gate electrode formed on the substrate to be connected to the gate bus line, a source electrode extended from one part of the gate bus line up to a crossing portion of the data and gate bus lines to be connected to the data bus line, and a drain electrode extended from the other part of the gate electrode to the pixel electrode, and is arranged corresponding to each of the pixel electrodes. The source, electrodes is formed to prevent the data bus line from being electrically disconnected. Even if an electrical disconnection of the data bus line occurs due to a step existing in the crossing portion of the gate and data bus lines, the data bus line remains connected to the source electrode.

3 Claims, 2 Drawing Sheets

LIQUID CRYSTAL DISPLAY DEVICE HAVING SOURCE ELECTRODE OVERLAPPING GATE LINE

This application is a continuation of U.S. Ser. No. 08/354,672, filed Dec. 13, 1994, now abandoned.

BACKGROUND OF THE INVENTION

1. Field of the Invention

The present invention relates to a liquid crystal display (hereinafter, referred to as "LCD") device, and more particularly to a liquid crystal display capable of avoiding disconnection of a data bus line caused due to a step (i.e. a height difference between piled gate and data bus lines) existing in an intersection of the gate and data bus lines.

2. Description of the Prior Art

FIG. 1 is a plane view showing the construction of a prior art liquid crystal display device.

Referring to FIG. 1, the prior art liquid crystal display device comprises a substrate 10, a plurality of thin film transistors (hereinafter, referred to as "TFTs") 11 arranged in matrix on the substrate 10, a plurality of pixel electrodes 14 arranged in matrix corresponding to each of the TFTs, a data bus line 13 commonly connected with a plurality of the TFTs in column direction and formed between two adjacent TFTs which are spaced from each other in row direction, and a gate bus line 12 commonly connected with a plurality of the TFTs in row direction and formed between two adjacent TFTs which are spaced from each other in column direction.

Each of the TFTs 11 has a gate electrode 11-1 formed on the substrate 10, a source electrode 11-2 extended over one part of the gate 11-1 and connected to the data bus line 13, and a drain electrode 11-3 extended over the other part of the gate 11-1 and connected to a corresponding pixel electrode 14.

A method for fabricating the prior art LCD device having the above-mentioned structure will be described below.

First, a plurality of TFTs is formed in matrix on an upper glass substrate.

To form a gate electrode 11-1 and a gate bus line 12 on a glass substrate, metallization and photolithograpy are sequentially performed. In the metallization, a metal having a good conductivity such as Cr, Al, AlTa, Ta, Ti or the like, is used to form a metal layer on the glass substrate. By the photolithograpy, a patterned electrode layer, i.e. the gate bus line and gate electrode, is formed on the substrate.

Next, on the gate electrode 11-1 a gate insulating layer (not shown in FIG. 1) is deposited by using PECVD(Plasma Enhanced Chemical Vapor Deposition) or APCVD (Atmospheric Pressure Chemical Vapor Deposition) as wellknown in this art. The gate insulating layer is composed of oxide or nitride and serves as a medium to form a capacitor in a channel region which is formed on the gate insulating layer.

After formation of the gate insulating layer, an $n^+$ type amorphous silicon layer is deposited on the gate insulating layer to form the channel region for electron transfer. The amorphous silicon layer can be deposited at temperature less than that a fusing point of the glass substrate. On the gate electrode 11-1, the amorphous silicon layer is patterned to form an active layer (not shown).

Subsequently, a pixel electrode 14 is formed on the gate insulating layer and is spaced from the active layer. Also, an $n^+$ type amorphous silicon layer (not shown) is formed between the active layer and the pixel electrode 14, thereby allowing an ohmic contact to be formed between the active layer and the source/drain electrode.

Also, at both sides of the active layer source and drain bus lines 11-2, 11-3 are formed, and thus fabrication of a TFT is completed. Such a TFT allows electrons to be transferred through the active layer between the source and drain electrodes.

In addition, after forming a color filter on a lower glass substrate, the upper and lower glass substrates are spaced and attached to each other by sealing. The glass substrates attached thus has a liquid crystal layer therebetween. The liquid crystal layer is formed by injecting a liquid crystal material between the two glass substrates. As a result, an LCD device is completely fabricated.

Operation of the prior art LCD device fabricated thus will be described hereinafter.

With reference to FIG. 1, when a constant voltage is applied to the gate 11-1 of the TFT 11 through the gate bus line 12, a channel for electron transfer is formed in the active layer thereof. Then, if a data signal from the data bus line 13 is supplied to the pixel electrode through the channel, an electron potential is generated between the upper and lower substrate. This is because the liquid crystal layer formed therebetween is used as a dielectric medium. In each pixel, a gradient of liquid crystal is determined in accordance with the amount of data (i.e. voltage level) to be supplied to the pixel electrode and an intensity of a light introduced from a back light also is determined. As a result, a display picture and/or a character can be displayed on a display portion of such an LCD device by distinction of intensity of a light introduced through the transparent pixel electrode. In the TFT of an LCD device, the gate bus line 12 is provided to supply a scanning signal to the gate electrode 11-2 thereof and the data bus line 13 is provided to supply a pixel voltage signal to the source electrode 3.

The above-mentioned LCD device has, as shown in FIG. 1, a matrix structure in which the gate and data bus lines 12, 13 are electrically isolated from each other with an insulating layer (not shown) interposed therebetween and are crossed with each other.

In the prior art LCD device having such a matrix structure, since a data bus line is formed on a gate bus line in addition to a surface of a glass substrate, a step (i.e. height difference) inevitably exists in a crossing position of gate and data bus lines. Thus, disconnection of the data bus line frequently occurs due to a step between the gate and data bus lines.

SUMMARY OF THE INVENTION

It is an object of the present invention to provide a liquid crystal display device in which a source electrode is further widely formed from one part of a gate electrode up to a crossing portion of the gate and data bus lines so as to prevent a data bus line from being disconnected due to a step existing at a crossing of the data bus line and a gate bus line.

According to the aspect of the present invention, the liquid crystal display device comprising a substrate; a plurality of pixel electrodes arranged in matrix; a plurality of data bus lines spaced from each other, each of the data bus lines being arranged between two adjacent pixel electrodes in row direction; a plurality of gate bus lines spaced from each other, each of the gate bus lines being arranged between two adjacent pixel electrodes in column direction and being intersected with each of the data bus line; and a plurality of thin film transistors arranged in matrix on the substrate, wherein each of the thin film transistors has a gate electrode formed on the substrate to be connected to the gate bus line, a source electrode extended from one part of the gate bus line up to a crossing portion of the data and gate bus lines to be connected to the data bus line, and a drain electrode extended from the other part of the gate electrode to the pixel electrode, and is arranged corresponding to each of the pixel electrodes.

In this LCD device, the source electrode is further widely formed from one part of the gate electrode up to a crossing portion of the gate and data bus lines 22, 23, whereby it is enable to prevent the data bus line from being electrically disconnected.

Therefore, even if an electrical disconnection of the data bus line occurs due to a step existing in the crossing portion of the gate and data bus lines, the data bus line can be electrically connected by the further widen source electrode, whereby it is enable to increase a yield in fabrication sequence of LCD devices.

BRIEF DESCRIPTION OF THE DRAWINGS

This invention may be better understood and its object will become apparent to those skilled in the art by reference to the accompanying drawings as follows.

DESCRIPTION OF THE PREFERRED EMBODIMENT

Figure 1:
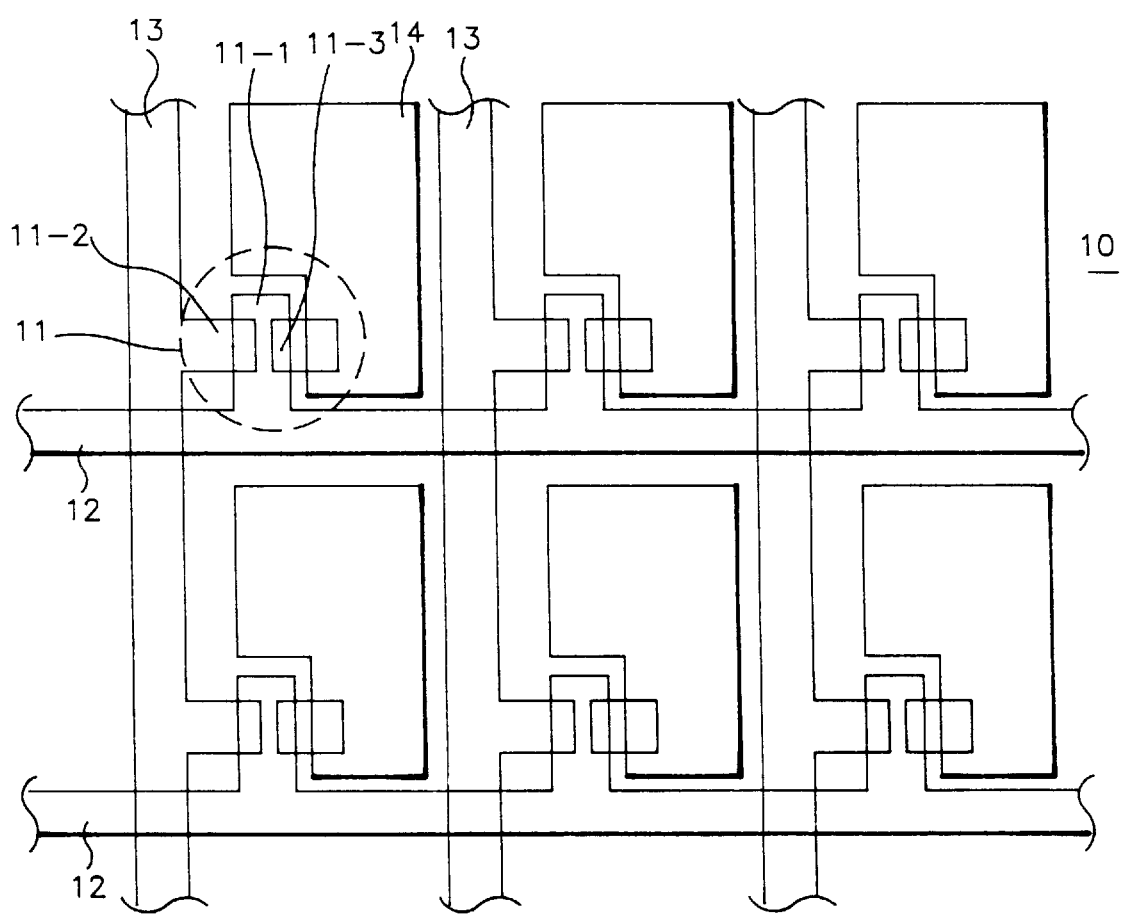
FIG. 1 is a plane view showing the construction of a prior art LCD device.
Figure 2:
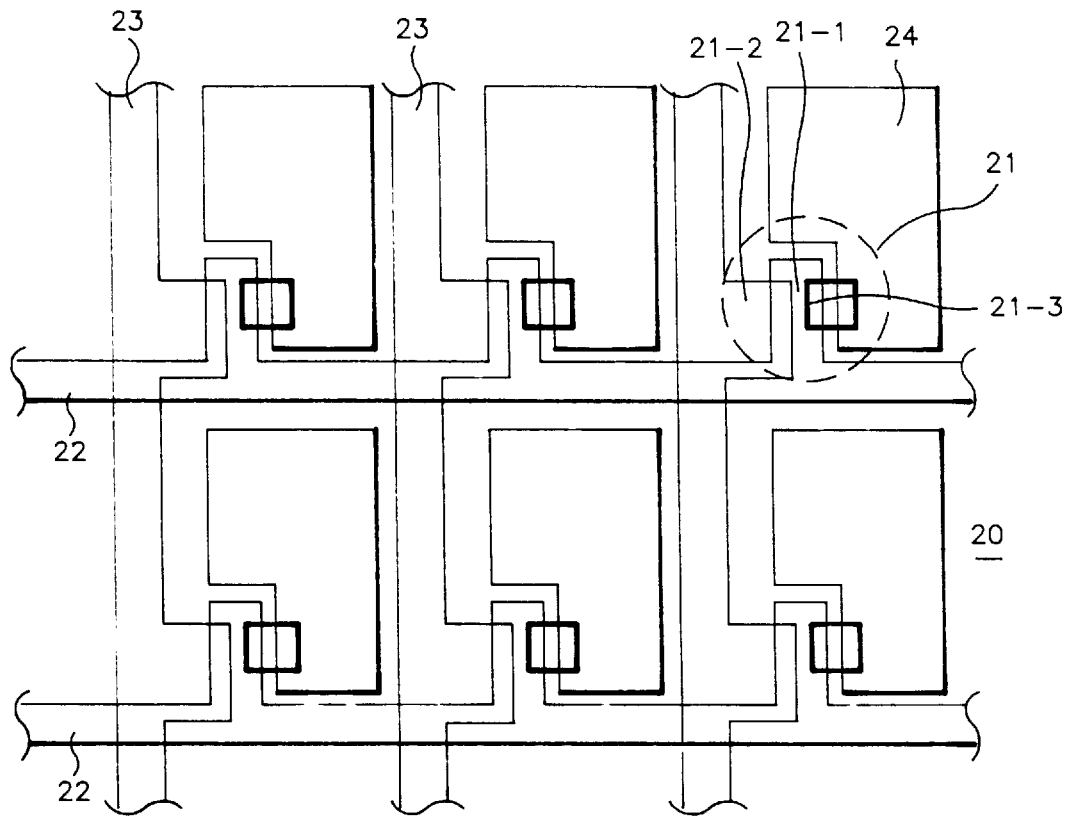
FIG. 2 is a plane view showing the construction of an LCD device of the present invention.

Referring to FIG. 2, the LCD device of the present invention comprises a substrate 20, a plurality of TFTs 21 arranged in matrix on the substrate 20, a plurality of pixel electrodes 24 arranged in matrix corresponding to each of the TFTs, a data bus line 23 commonly connected with a plurality of the TFTs in column direction and formed between two adjacent TFTs which are spaced from each other in row direction, and a gate bus line 22 commonly connected with a plurality of the TFTs in row direction and formed between two adjacent TFTs which are spaced from each other in column direction.

Each of the TFTs 21 has a gate electrode 21-1 formed on the substrate 20, a source electrode 21-2 extended over the gate bus line 23 in addition to one part of the gate electrode 21-1 and connected to the data bus line 13, and a drain electrode 21-3 extended over the other part of the gate electrode 21-1 and connected to a corresponding pixel electrode 14. The source electrode 21-2 is widely formed from one part of the gate electrode 21-1 up to a crossing portion of the gate and data bus lines 22, 23.

Figure 3:
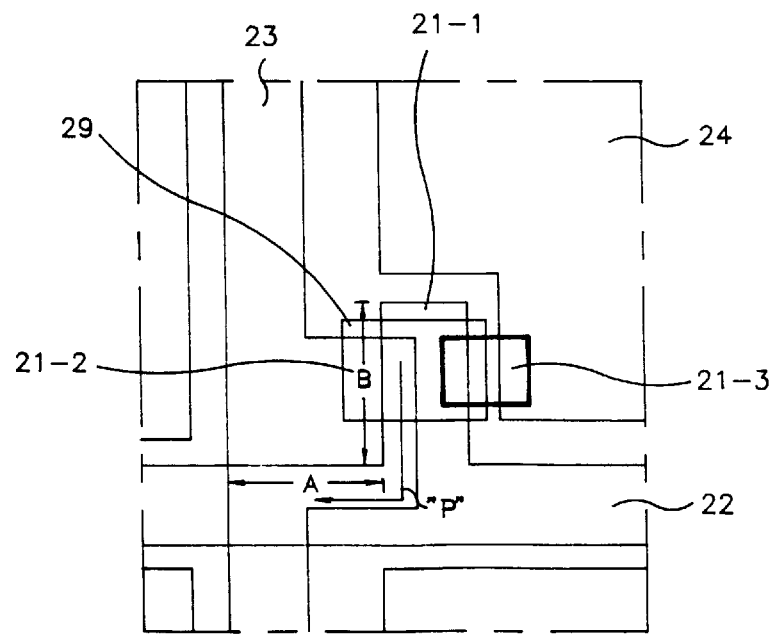
FIG. 3 is an enlarged view of a portion of the LCD of FIG. 2.

As mentioned above, because the source electrode 21-2 is extended from one part of the gate electrode up to the crossing portion of the gate and data bus lines 22, 23, a current signal passes through a current flowing path indicated by an arrow "P" in FIG. 3, even though a disconnection of the data bus line 23 occurs in a step portion "A" of a crossing of the data and gate bus lines, as shown in FIG. 3.

In addition, a step portion "B" including a non-overlapping portion of the crossing thereof is longer three times and more than the step portion "A", and thus there is nearly no probability that disconnection of the data bus line occurs in the step portion "B". In FIG. 3, reference numeral 29 indicates an amorphous silicon active layer.

As described above, a redundancy effect of a data bus line can be obtained by a structure that a source electrode is further widely formed from one part of a gate electrode up to a crossing portion of gate and data bus lines, whereby it is enable to prevent the data bus line from being electrically disconnected.

Therefore, according to the LCD device of the present invention, even if an electrical disconnection of the data bus line occurs due to a step existing in the crossing portion of the gate and data bus lines, the data bus line can be electrically connected by the further widen source electrode, whereby it is enable to increase a yield in fabrication sequence of LCD devices.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A liquid crystal display device comprising:

a substrate;

a plurality of pixel electrodes arranged in matrix;

a plurality of data bus lines spaced from each other, each of the data bus lines being arranged between two adjacent pixel electrodes in a first direction;

a plurality of gate bus lines spaced from each other, each of the gate bus lines being arranged between two adjacent pixel electrodes in a second direction and intersecting each of the data bus lines; and a plurality of thin film transistors formed next to each data and gate bus line and corresponding to each of the pixel electrodes, wherein each of the thin film transistors includes a gate electrode formed on the substrate and extended from the gate bus line, a source electrode extended from a part of the data bus line and having a first part overlapping the gate electrode and a second part overlapping the gate bus line and a third part non-overlapped to both the gate electrode and the gate bus line, and a drain electrode extended from another part of the gate electrode to the pixel electrode.

2. A liquid crystal display device as claimed in claim 1, wherein the source electrode extends to a part of each data bus line intersecting the respective gate bus line.

3. A liquid crystal display comprising:

a gate bus line extended in a first direction, said gate bus line having a gate electrode extended therefrom; and, a data bus line extended in a second direction vertical to the first direction, said data bus line having a source electrode extended therefrom, wherein said source electrode having a first part overlapping the sate electrode, a second part overlapping the gate bus line and a third part non-overlapped to both the gate electrode and the gate bus line, said source electrode having a length in the first direction shorter than the length in the second direction.

* * * * *